United States Patent
Choi et al.

(10) Patent No.: US 8,639,220 B2
(45) Date of Patent: Jan. 28, 2014

(54) METHOD AND SYSTEM FOR PROVIDING WI-FI SERVICE BY WI-FI DEVICE

(75) Inventors: Jong Mu Choi, Gunpo-si (KR); You Na Lee, Suwon-si (KR); Jhong Il Kim, Suwon-si (KR); Jun Ho Lee, Yongin-si (KR); Jung Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 13/107,209

(22) Filed: May 13, 2011

(65) Prior Publication Data

US 2011/0281557 A1 Nov. 17, 2011

(51) Int. Cl.
*H04M 1/66* (2006.01)
*H04W 4/00* (2009.01)

(52) U.S. Cl.
USPC ........................................ 455/411; 455/422.1

(58) Field of Classification Search
USPC .................. 455/411, 41.3, 404.2, 408, 412.1, 455/414.1, 422.1, 550.1, 509, 558, 566
See application file for complete search history.

(56) References Cited

U.S. PATENT DOCUMENTS

| | | | |
|---|---|---|---|
| 8,170,481 B2 * | 5/2012 | Rangarajan et al. | 455/41.2 |
| 2004/0205246 A1 | 10/2004 | Park | |
| 2005/0078644 A1 | 4/2005 | Tsai et al. | |
| 2009/0104875 A1 * | 4/2009 | Naniyat | 455/41.3 |
| 2010/0195539 A1 * | 8/2010 | Tian et al. | 370/255 |
| 2011/0149806 A1 * | 6/2011 | Verma et al. | 370/255 |

* cited by examiner

*Primary Examiner* — Michael Faragalla
(74) *Attorney, Agent, or Firm* — Jefferson IP Law, LLP

(57) ABSTRACT

A method and a system for providing a Wireless Fidelity (Wi-Fi) service, in which when multiple counterpart devices are selected based on manufacturer information and support information on supported functions and capability defined in a service information field of each beacon message or each probe response message, a final device is determined by checking multiple pieces of signal information of the selected counterpart devices, are provided. The method includes receiving messages from multiple counterpart devices, selecting one or more counterpart devices, each of which supports a requested service, from an identical manufacturer when the messages are received, checking multiple pieces of signal information of the selected counterpart devices when the number of the selected counterpart devices is greater than one, and determining a device having the signal information satisfying set conditions as a final device.

17 Claims, 10 Drawing Sheets

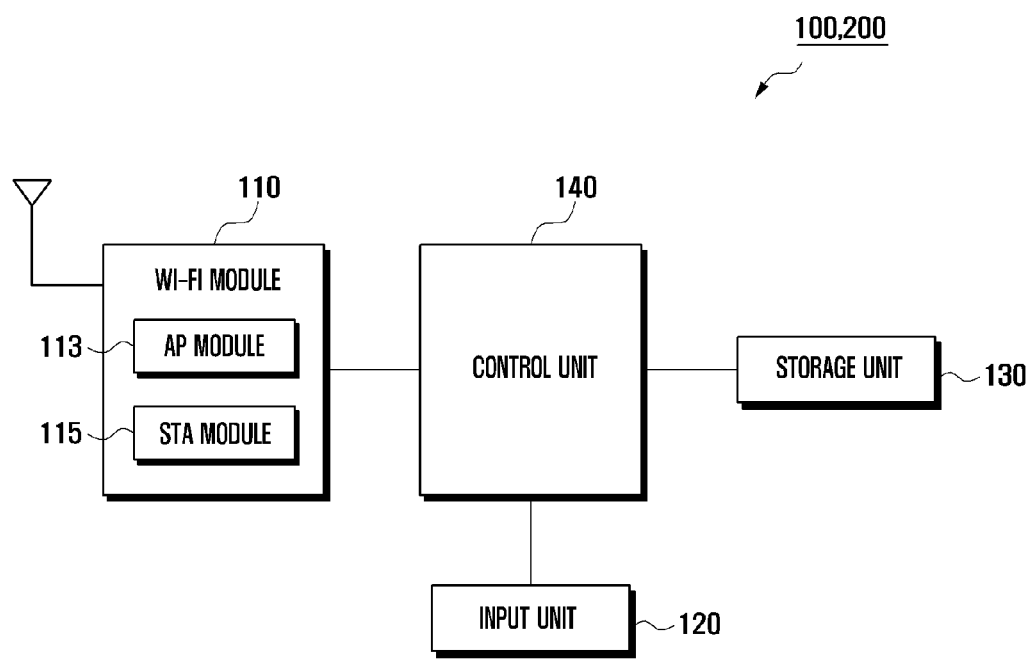

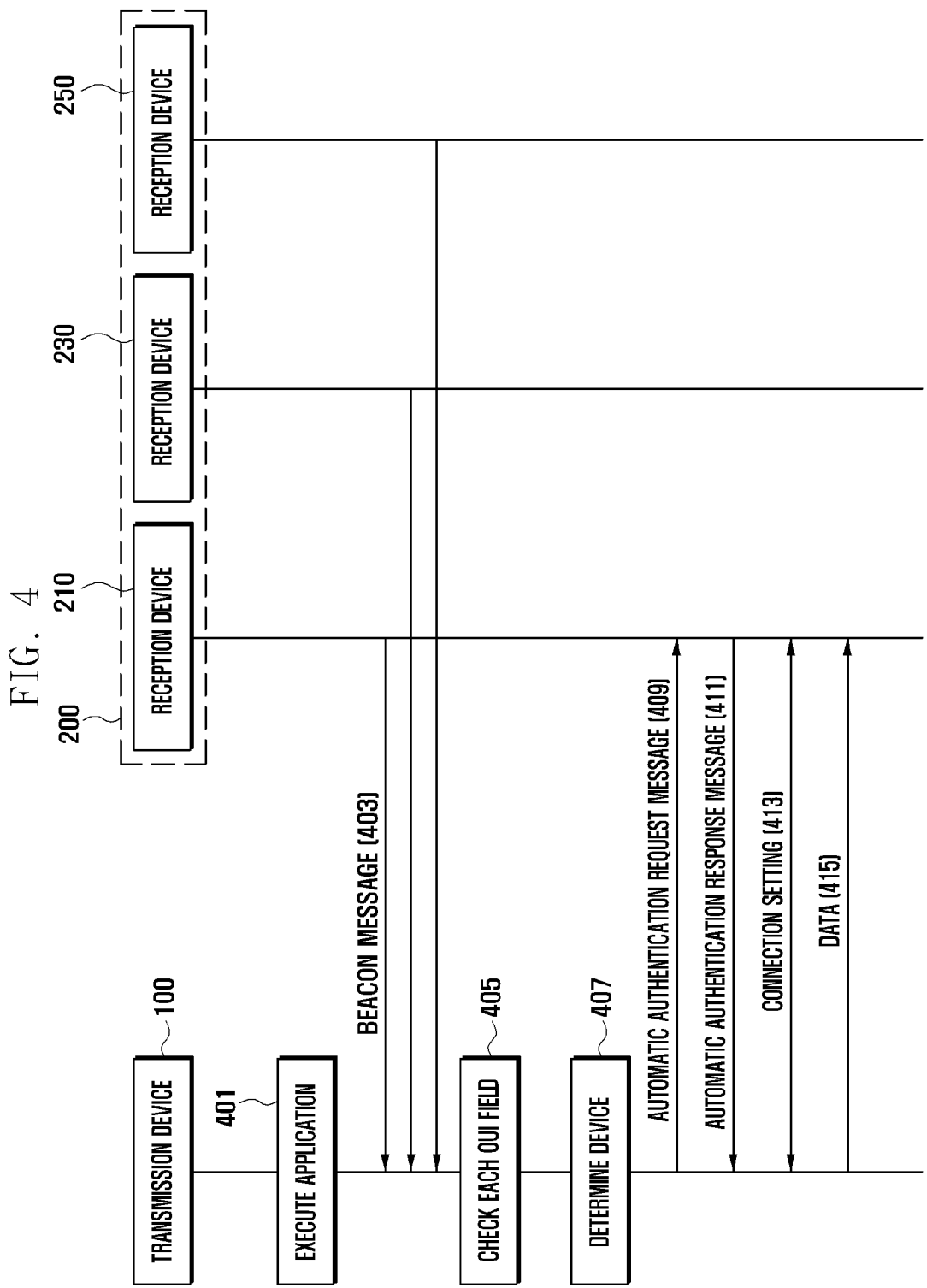

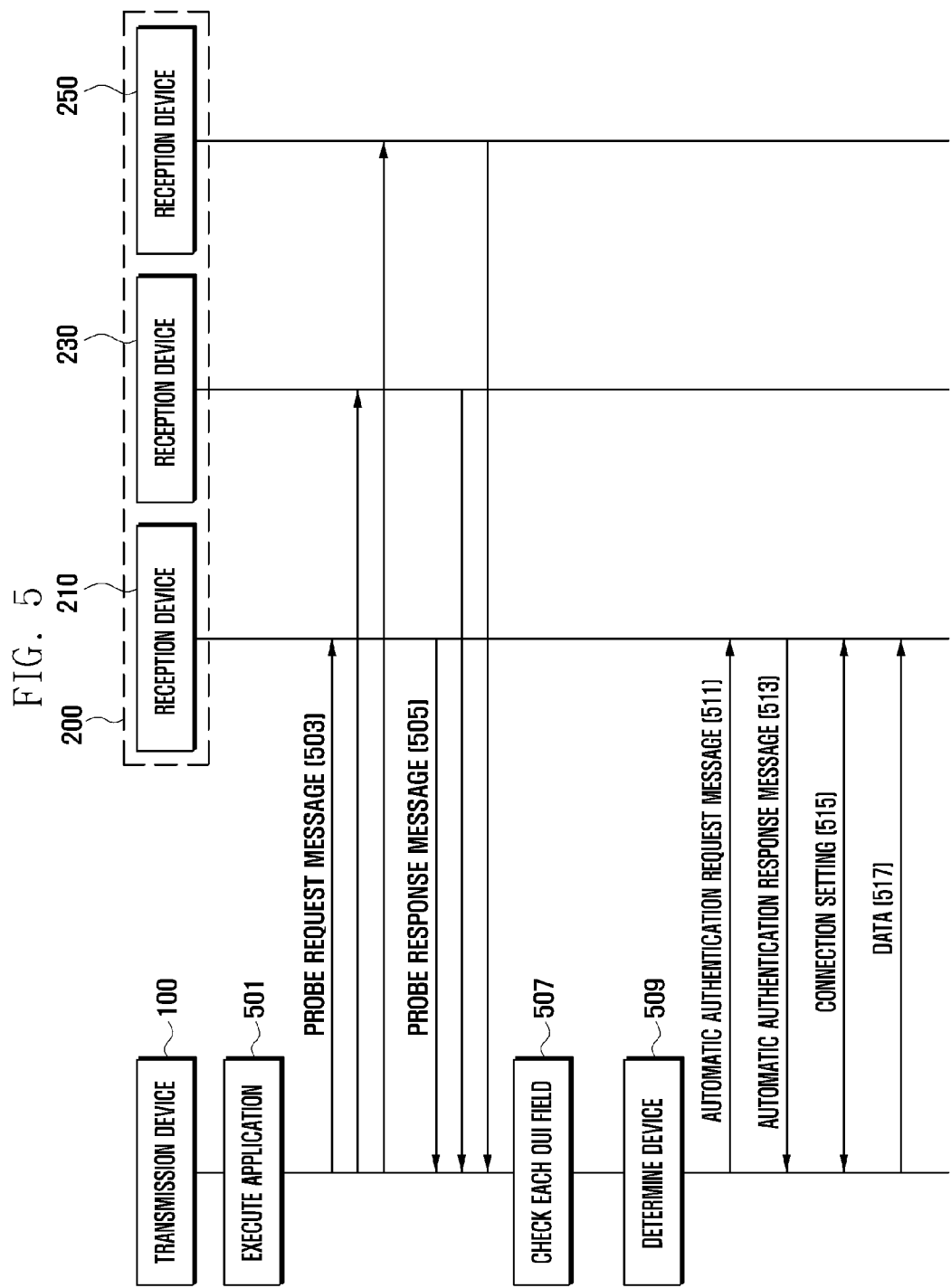

FIG. 11A

| Category | ID Value | Sub Category | ID Value |
|---|---|---|---|
| Computer | 1 | PC | 1 |
| | | Server | 2 |
| | | Media Center | 3 |
| | | Ultra-mobile PC | 4 |
| | | Notebook | 5 |
| | | Desktop | 6 |
| | | MID (Mobile Internet Device) | 7 |
| | | Netbook | 8 |
| Input Device | 2 | Keyboard | 1 |
| | | Mouse | 2 |
| | | Joystick | 3 |
| | | Trackball | 4 |
| | | Gaming controller | 5 |
| | | Remote | 6 |
| | | Touchscreen | 7 |
| | | Biometric reader | 8 |
| | | Barcode reader | 9 |
| Printers, Scanners, Faxes and Copiers | 3 | Printer or Print Server | 1 |
| | | Scanner | 2 |
| | | Fax | 3 |
| | | Copier | 4 |
| | | All-in-one (Printer, Scanner, Fax, Copier) | 5 |
| Camera | 4 | Digital Still Camera | 1 |
| | | Video Camera | 2 |
| | | Web Camera | 3 |
| | | Security Camera | 4 |
| Storage | 5 | NAS | 1 |
| Network Infrastructure | 6 | AP | 1 |
| | | Router | 2 |
| | | Switch | 3 |
| | | Gateway | 4 |
| Displays | 7 | Television | 1 |
| | | Electronic Picture Frame | 2 |
| | | Projector | 3 |
| | | Monitor | 4 |

FIG. 11B

| Category | ID Value | Sub Category | ID Value |
|---|---|---|---|
| Multimedia Devices | 8 | DAR | 1 |
| | | PVR | 2 |
| | | MCX | 3 |
| | | Set-top box | 4 |
| | | Media Server/Media Adapter/Media Extender | 5 |
| | | Portable Video Player | 6 |
| Gaming Devices | 9 | Xbox | 1 |
| | | Xbox360 | 2 |
| | | Playstation | 3 |
| | | Game Console/Game Console Adapter | 4 |
| | | Portable Gaming Device | 5 |
| Telephone | 10 | Windows Mobile | 1 |
| | | Phone – single mode | 2 |
| | | Phone – dual mode | 3 |
| | | Smartphone – single mode | 4 |
| | | Smartphone – dual mode | 5 |
| Audio Devices | 11 | Audio tuner/receiver | 1 |
| | | Speakers | 2 |
| | | Portable Music Player (PMP) | 3 |
| | | Headset (headphones + microphone) | 4 |
| | | Headphones | 5 |
| | | Microphone | 6 |
| Others | 255 | | |

20# METHOD AND SYSTEM FOR PROVIDING WI-FI SERVICE BY WI-FI DEVICE

PRIORITY

This application claims the benefit under 35 U.S.C. §119(a) of a Korean patent application filed in the Korean Intellectual Property Office on May 14, 2010 and assigned Serial No. 10-2010-0045288, the entire disclosure of which is hereby incorporated by reference.

BACKGROUND OF THE INVENTION

1. Field of the Invention

The present invention relates to a Wireless Fidelity (Wi-Fi) device. More particularly, the present invention relates to a method and a system in which Wi-Fi devices share support information on functions that they support by transmitting/receiving the support information to/from each other and provide Wi-Fi services based on the shared support information.

2. Description of the Related Art

With the development of wireless technology, wired networks that were once used by many people have recently been replaced by wireless networks. Namely, since wireless technology can address the problem of restriction on mobility that a wired network has, research on technologies that use a wireless network has been actively conducted. Also, the propagation and use of various portable terminals have recently rapidly increased due to the remarkable development of information communication technology, semiconductor technology, etc. More particularly, recent portable terminals provide a mobile convergence phase in which they do not stay in a traditional domain but covers domains of other terminals. As an example, a mobile communication terminal has various additional functions, which include a Television (TV) viewing function (e.g. mobile broadcasting such as Digital Multimedia Broadcasting (DMB) or Digital Video Broadcasting (DVB)), a music playback function (e.g. Moving Picture Experts Group Audio Layer-3 (MP-3), a function for taking photos, a Wi-Fi connection function, etc., as well as typical communication functions (e.g. a voice phone call and message transmission/reception).

A Wireless Local Area Network (WLAN) is also known as "Wireless Fidelity (Wi-Fi)" because a wireless network can be conveniently used, similar to high-fidelity (hi-fi) audio. In the WLAN, the Internet can be accessed through a portable terminal or a notebook computer within a predetermined radius an Access Point (AP). Thus, the WLAN, which has the potential of an open-type wireless network, is being rapidly spread along with the popularization of portable terminals. Currently, Wi-Fi is being used to provide high-speed data services to various locations including schools, airports, hotels, offices, etc.

However, there is a problem in that a connection function essential for a Wi-Fi service is inconvenient. Accordingly, a portable terminal supporting the Wi-Fi provides a Wi-Fi Protected Setup (WPS) function for simple and easy settings from a wireless connection to a security setting. Namely, each Wi-Fi device currently provides a function capable of setting a secure connection between Wi-Fi devices by pressing a particular button assigned by the WPS function or by directly inputting a given PIN code.

However, the above WPS function is not widely recognized by general users. Also, the WPS function has the inconvenience of requiring a user to manually press a particular assigned button or manually input multiple digits of a Personal Identification Number (PIN) code. Further, each portable convergence terminal, which has recently been propagated, requires a new process for a Wi-Fi connection in addition to the existing convergence function. Accordingly, inconvenience is caused to users of the portable convergence terminals.

SUMMARY OF THE INVENTION

Aspects of the present invention are to address at least the above-mentioned problems and/or disadvantages and to provide at least the advantages described below. Accordingly, an aspect of the present invention is to provide a method and a system in which Wireless Fidelity (Wi-Fi) devices can exchange information with each other regarding functions that they support.

Another aspect of the present invention is to provide a control method by which a Wi-Fi device can select an optimal counterpart Wi-Fi device supporting functions of a Wi-Fi service-based application when the Wi-Fi device executes the Wi-Fi service-based application.

Another aspect of the present invention is to provide a method and a system in which a Wi-Fi device can provide services by rapidly selecting and setting a connection to an optimal counterpart Wi-Fi device for operating a Wi-Fi service-based application based on support information provided by other Wi-Fi devices.

Another aspect of the present invention is to provide a method and a system capable of selecting an optimal counterpart Wi-Fi device from multiple counterpart Wi-Fi devices by checking the received signal intensities of the multiple counterpart Wi-Fi devices during automatic connection setting of a Wi-Fi Protected Setup (WPS) function according to automatic authentication between the Wi-Fi devices.

Another aspect of the present invention is to provide a method and a system that can implement an optimal Wi-Fi service environment capable of providing the user convenience of using a Wi-Fi service by enabling Wi-Fi devices to share information supported by themselves with each other.

Another aspect of the present invention is to provide a method and a system that improve the usability and convenience of a Wi-Fi device by automatically selecting an optimal counterpart Wi-Fi device capable of using a particular Wi-Fi based service.

In accordance with an aspect of the present invention, a method for providing a Wi-Fi service is provided. The method includes receiving messages from multiple counterpart devices, selecting one or more counterpart devices, each of which supports a requested service, from an identical manufacturer when the messages are received, checking multiple pieces of signal information of the selected counterpart devices when the number of the selected counterpart devices is greater than one, and determining a device having the signal information satisfying set conditions as a final device.

In accordance with another aspect of the present invention, a system for providing a Wireless Fidelity (Wi-Fi) service is provided. The system includes multiple first devices, each of which transmits a message including a service information field for including manufacturer information of devices and information on capabilities and functions supported by each device, and a second device for selecting one or more counterpart devices for performing a particular Wi-Fi based service with reference to the service information field of a message received from each first device, and for determining, as a final device, a device having signal information satisfying set conditions among the selected counterpart devices, each of which has signal information thereof, when the number of the selected counterpart devices is greater than one.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a block diagram schematically illustrating a configuration of a Wireless Fidelity (Wi-Fi) device according to an exemplary embodiment of the present invention;

FIG. 3 is an illustrative view showing a message format used to transmit support information of another Wi-Fi device according to an exemplary embodiment of the present invention;

FIG. 4 is a signal flow diagram illustrating an operation for a Wi-Fi based service between Wi-Fi devices according to an exemplary embodiment of the present invention;

FIG. 5 is a signal flow diagram illustrating an operation for a Wi-Fi based service between Wi-Fi devices according to an exemplary embodiment of the present invention;

FIGS. 11A and 11B are an illustrative view showing an information table according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
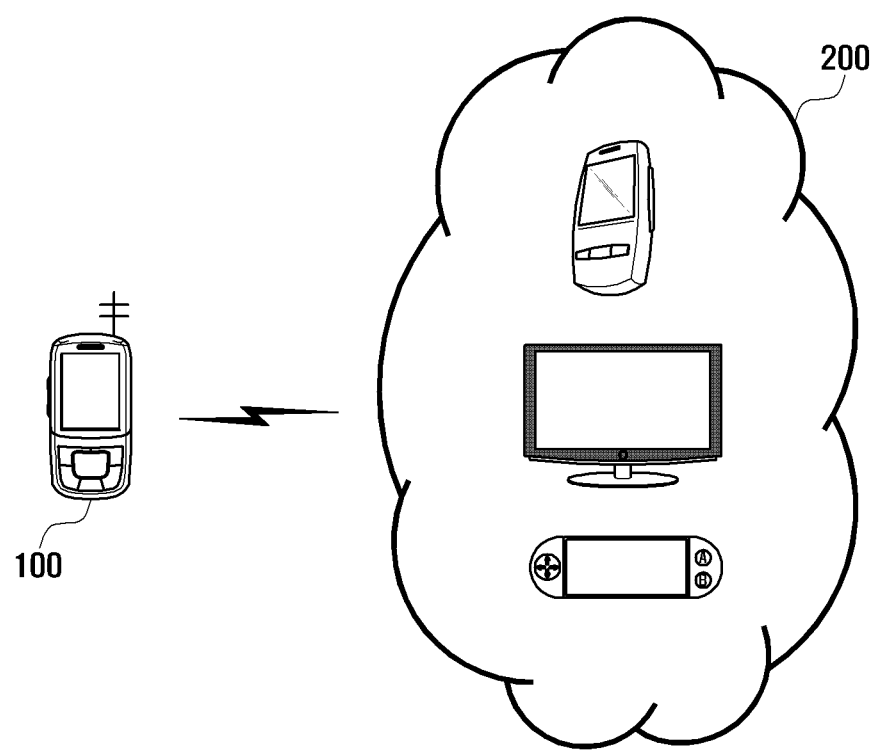
FIG. 1 is a schematic view illustrating the configuration of a system for describing an operation according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following disclosure relates to a technology for automatic authentication between Wireless Fidelity (Wi-Fi) devices. According to an exemplary embodiment of the present invention, a Wi-Fi Protected Setup (WPS) function for simple and easy settings from a wireless connection to a security setting can be extended without a complicated setting process in a Wi-Fi device. Namely, a user can set a connection between Wi-Fi devices by pressing a particular button assigned to a Wi-Fi device or by inputting a given Personal Identification Number (PIN) code through the Wi-Fi device in order to use a WPS function. Moreover, exemplary embodiments of the present invention enable automatic authentication without the intervention of a user when the use of a WPS function is desired. To this end, in an exemplary implementation, Wi-Fi devices can transmit information to each other regarding functions that they support, so that each of the Wi-Fi devices can recognize the information regarding functions supported by a counterpart Wi-Fi device. Also, exemplary embodiments of the present disclosure propose an apparatus and a control method, in which a Wi-Fi device can determine an optimal counterpart Wi-Fi device among multiple counterpart Wi-Fi devices during automatic connection setting of the WPS function according to automatic authentication between the Wi-Fi devices based on the support information. Therefore, an exemplary apparatus and control method proposed by the present disclosure can more simply and easily support a Wi-Fi service.

Hereinafter, an exemplary configuration of a Wi-Fi device and a method for controlling the operation thereof will be described with reference to FIGS. 1 to 11B. However, it should be noted that the configuration of a Wi-Fi device and a method for controlling the operation thereof are not limited to the following description and can be applied to various embodiments based on the following description.

FIG. 1 is a schematic view illustrating the configuration of a system for describing an operation according to an exemplary embodiment of the present invention.

Referring to FIG. 1, a system of the present invention includes a Wi-Fi device (hereinafter, referred to as a "transmission device") 100 functioning as a transmitter, and a Wi-Fi device (hereinafter, referred to as a "reception device") 200 functioning as a receiver. In this specification, a transmission device and a reception device are discriminated from each other for convenience of description. Further, in the present invention, the reception device 200 may represent multiple Wi-Fi devices. For example, the reception device 200 may be any of various electronic apparatuses including a music playback player, a display apparatus, a portable game terminal, a printer, etc, each of which includes a built-in Wi-Fi module. In the following description, the reception device 200 will be described as any one or multiple ones among the various electronic apparatuses as described above. Of course, it is to be understood that the transmission device 100 may also include any of various electronic apparatuses including a music playback player, a display apparatus, a portable game terminal, a printer, etc, each of which includes a built-in Wi-Fi module. For ease of description, the transmission device 100 is illustrated in FIG. 1 as a mobile communication terminal.

As illustrated in FIG. 1, the Wi-Fi based system may support a Wi-Fi direct function between the transmission device 100 and the reception device 200, and the transmission device 100 and the reception device 200 may be directly interconnected in a Direct Access (DA) mode. Namely, FIG. 1 illustrates the relation of setting a connection between the Wi-Fi devices 100 and 200 in the DA mode. In this system, the Wi-Fi devices 100 and 200 located within a short distance of each other may be directly interconnected in the DA mode by using Wi-Fi modules, instead of being connected through an Access Point (AP).

Also, the Wi-Fi devices 100 and 200 may exchange information with each other regarding functions that they support. For example, when a user executes a Wi-Fi service-based application in the transmission device 100, the transmission device 100 identifies support information transmitted from the reception device 200. Then, as an example, the transmission device 100 can first select reception devices, which have been manufactured by the same manufacturer as that of the transmission device 100, with reference to the identified support information. When the number of reception devices selected by the first selection is greater than one, the transmission device 100 may secondly select reception devices capable of supporting a Wi-Fi service according to the executed application among the multiple first-selected reception devices. Further, when the number of the secondly-selected reception devices is also greater than one, the transmission device 100 may determine an optimal reception device for the Wi-Fi service among the multiple secondly-selected reception devices by checking multiple pieces of signal information (e.g. received signal intensities) from the secondly-selected reception devices. Then, data related to the executed application is transmitted to the determined reception device, so that the application may be executed in the determined reception device. An exemplary method for transmitting support information and determining a final counterpart device as described above, and a control method thereof, which is related to the above method, will be described with reference to the drawings described below.

Meanwhile, FIG. 1 illustrates the configuration of the system in which the Wi-Fi devices 100 and 200 are interconnected in the DA mode. However, the Wi-Fi devices 100 and 200 are not limited to a connection in the DA mode. Namely, the Wi-Fi devices 100 and 200 may have a configuration for a system using a Wireless Local Area Network (WLAN), or a system configuration for interconnection between the Wi-Fi devices 100 and 200 through an AP.

For example, the Wi-Fi devices 100 and 200 include Wi-Fi modules and may be connected to an Internet network through a repeater (e.g. a router) via an AP in a hotspot area. In this system, the Wi-Fi devices 100 and 200 may be connected to the Internet network via a mobile communication network in an area that is not equipped with the AP. Also, when it is difficult to set a direct interconnection between the Wi-Fi devices 100 and 200 in the DA mode without a connection through the AP, the Wi-Fi devices 100 and 200 may be set to be interconnected through the APs for data transmission/reception.

FIG. 2 is a block diagram schematically illustrating a configuration of a Wi-Fi device according to an exemplary embodiment of the present invention. The configuration of a Wi-Fi device as illustrated in FIG. 2 may be commonly applied to both the transmission device 100 and the reception device 200 as described above with reference to FIG. 1.

Referring to FIG. 2, a Wi-Fi device includes a Wi-Fi module 110, an input unit 120, a storage unit 130, and a control unit 140. Also, the Wi-Fi device may include various configurations, depending on the form thereof. For example, the Wi-Fi device may further include a display unit for displaying screen data, a Radio Frequency (RF) module for performing a mobile communication function, an audio processor having a microphone (MIC) and a speaker (SPK), a camera module for capturing still or moving images, a digital broadcasting module for receiving and reproducing digital broadcasting (e.g. mobile broadcasting such as Digital Multimedia Broadcasting (DMB) or Digital Video Broadcasting (DVB)), and a Bluetooth communication module for performing a Bluetooth communication function. However, the description and illustration of the above elements will be omitted.

The above Wi-Fi module 110 supports Internet Protocol (IP)-based mobile communication of the Wi-Fi device. In an exemplary embodiment, the Wi-Fi module 110 includes an AP module 113 and a station (STA) module 115. Under the control of the control unit 140, the Wi-Fi module 110 may operate in an AP mode by waking the AP module 113 or may operate in a non-AP mode (i.e. an STA mode) by waking the STA module 115. In this specification, the non-AP mode (i.e. the STA mode) refers to a mode in which a Wi-Fi device operates depending on the function of a device side when providing a Wi-Fi based service. For example, the non-AP mode may refer to a mode in which a Wi-Fi device operates as the transmission device 100 as described above with reference to FIG. 1. Also, in this specification, the AP mode refers to a mode in which the Wi-Fi device operates depending on the function of an AP side when providing the Wi-Fi based service. For example, the AP mode may refer to a mode in which a Wi-Fi device operates as the reception device 200 as described above with reference to FIG. 1. In this specification, the AP mode and the non-AP mode (i.e. the STA) are classified for convenience of description.

The Wi-Fi module 110 transmits support information regarding functions supported by the Wi-Fi device according to the control of the controller 140 in the AP mode of the Wi-Fi device. For example, the Wi-Fi module 110 may periodically broadcast a beacon message, which includes the support information of the Wi-Fi device, through the AP module 113 in the AP mode. Otherwise, in the AP mode, the Wi-Fi module 110 may receive a request message (e.g. a probe request message) from another Wi-Fi device (e.g. the transmission device 100 illustrated in FIG. 1) which operates in the non-AP mode, and then provide the received request message to the control unit 140. In response, the Wi-Fi module 110 may transmit a message (e.g. a probe response message), which includes the support information of the Wi-Fi device and is provided by the control unit 140, through the AP module 113.

Also, the Wi-Fi module 110 may transmit a probe request message as described above to another Wi-Fi device (e.g. the reception device 200 illustrated in FIG. 1), which operates in the AP mode, through the STA module 115 in the non-AP mode of the Wi-Fi device. Then, the Wi-Fi module 110 may receive a beacon message or a probe response message as described above, which includes support information of another Wi-Fi device operating in the AP mode and is transmitted from the other Wi-Fi device, through the STA module 115, and provide the received beacon message or probe response message to the control unit 140. Next, the Wi-Fi module 120 may transmit/receive an automatic authentication request message and an automatic authentication response message as described below.

The transmission and reception of the messages as described above, which include a beacon message, a probe request message, a probe response message, an automatic authentication request message, and an automatic authentication response message, will be described in more detail in the following discussion regarding a method for operation control.

The input unit 120 detects a handling action of a user and generates an input signal corresponding to the detected handling action. The input unit 120 provides the generated input signal to the control unit 140. The input unit 120 may include multiple buttons. More particularly, the input unit 120 may include at least one button for generating a user input signal related to the execution (e.g. performing a WPS function for setting a connection between Wi-Fi devices) of a Wi-Fi function for using a Wi-Fi based service.

The storage unit 130 stores various programs and data executed and processed by the Wi-Fi device. It may include at least one volatile memory device and at least one nonvolatile memory device. For example, the storage unit 130 may continually or temporarily store an operating system of the Wi-Fi device, programs and data related to a control operation for an AP mode by the Wi-Fi module 110, programs and data related to a control operation for a non-AP mode (i.e. an STA mode) by the Wi-Fi module 110, programs and data related to a control operation for an automatic authentication function in the Wi-Fi device, programs and data related to a control operation for the transmission function of support information of the Wi-Fi device, programs and data related to a control operation for the function of determining an optimal counterpart Wi-Fi device by using signal information (e.g. a received signal intensity), etc. The storage unit 130 may store a threshold for determining an optimal counterpart Wi-Fi device. Also, the storage unit 130 may store an information table for providing the support information of the Wi-Fi device. In this specification, the information table may be constructed as illustrated in FIGS. 11A and 11B.

FIGS. 11A and 11B are an illustrative view showing an information table according to an exemplary embodiment of the present invention.

Referring to FIGS. 11A and 11B, the information table includes a category field indicating a device type (e.g. Telephone, Computer, Printers, etc.) to which a Wi-Fi device belongs, an Identifier (ID) value field indicating an identifier (e.g. 10) for identifying a relevant Category (e.g. Telephone), a Sub-category field indicating information (i.e. a convergence function, capability, Windows Mobile, Phone-single mode, Phone-dual mode, etc.) supported by a device belonging to the relevant Category (e.g. Telephone), an ID value field indicating an identifier (e.g. 1, 2 or 3) for identifying each piece of information supported by a relevant Sub-category, etc. Also, the information table may include a single category (e.g. Telephone) among the Category items as described above depending on the type of a Wi-Fi device, and may include an ID value for the Category, and sub-categories and ID values for the Sub-categories. For example, when the type of the Wi-Fi device corresponds to "Telephone," the information table may be constructed as illustrated in Table 1 below for the category "Telephone" among the illustrations shown in FIGS. 11A and 11B. Also, the information table includes information on Sub-categories which may change depending on functions supported by the relevant Wi-Fi device in Table 1 below.

TABLE 1

| Category | ID value | Sub-category | ID value |
|---|---|---|---|
| Telephone | 10 | Windows mobile | 1 |
| | | Phone-single mode | 2 |
| | | Phone-dual mode | 3 |
| | | Smartphone-single mode | 4 |
| | | Smartphone-dual mode | 5 |

The control unit 140 controls overall operations of the Wi-Fi device. The control unit 140 may control an operation related to functions for providing a Wi-Fi based service of the Wi-Fi device. Also, the control unit 140 may control an operation related to the automation of a WPS function of the Wi-Fi device. For example, the control unit 140 may control the automation of the WPS function through an automatic authentication function in the Wi-Fi device. In an exemplary implementation, the control unit 140 may control operation of the Wi-Fi module 110 by set periods. For example, the control unit 140 may wake the AP module 113 of the Wi-Fi module 110 or may wake the STA module 115 of the Wi-Fi module 110 by the set periods.

Also, the control unit 140 may control an operation related to the AP mode and the non-AP mode (i.e. the STA mode) of the Wi-Fi device according to an operating scheme of the Wi-Fi module 110. For example, when the Wi-Fi device operates in the AP mode and periodically broadcasts a beacon message at beacon intervals, the control unit 140 may include manufacturer information of the Wi-Fi device and support information on functions and capability supported by the Wi-Fi device in the beacon message, and may transmit the beacon message including them. Also, when the Wi-Fi device operates in the AP mode and receives a probe request message from a counterpart Wi-Fi device operating in the non-AP mode (i.e. the STA mode), the control unit 140 may include manufacturer information of the Wi-Fi device and support information on functions and capability supported by the Wi-Fi device in a probe response message corresponding to the received probe request message, and may transmit the probe response message including them to the counterpart Wi-Fi device.

Also, when the Wi-Fi device operates in the non-AP mode (i.e. the STA mode) and receives a beacon message or a probe response message from a counterpart Wi-Fi device operating in the AP mode, the control unit 140 may check support information included in the relevant beacon message or probe response message, and may confirm functions and capability supported by the counterpart Wi-Fi device. More particularly, when the Wi-Fi device executes an application according to the Wi-Fi based service, the control unit 140 may determine an optimal counterpart Wi-Fi device for the Wi-Fi based service corresponding to the executed application based on the support information obtained from the counterpart Wi-Fi device as described above. For example, the control unit 140 may first select reception devices of the same manufacturer based on the support information of the beacon messages or probe response messages. When the number of the first-selected reception devices is greater than one, the control unit 140 may secondly select reception devices capable of supporting the particular requested service among the multiple first-selected reception devices. When the number of the secondly-selected reception devices is greater than one, the control unit 140 may determine a final counterpart Wi-Fi device for the Wi-Fi service among the multiple secondly-selected reception devices by checking multiple pieces of signal information (e.g. received signal intensities) from the secondly-selected reception devices.

The control unit 140 may control operating of the Wi-Fi based service according to the determined counterpart Wi-Fi device and the executed application. For example, when an application related to video data reproduction is executed, the control unit 140 may determine a counterpart Wi-Fi device having a video data output function, by checking the obtained support information. Thereafter, the control unit 140 transmits the video data to the determined counterpart Wi-Fi device, so that the determined counterpart Wi-Fi device can output the received video data.

When the counterpart Wi-Fi device has been determined, the control unit 140 may control connection setting according to the transmission/reception of an automatic authentication request message and an automatic authentication response message as described below. For example, when the Wi-Fi device operates in the non-AP mode, the control unit 140 may control transmitting of the automatic authentication request message, which includes a PIN code or a button input command code, to a counterpart Wi-Fi device in a scheme defined for a WPS function. Also, when the Wi-Fi device operates in the AP mode and receives an automatic authentication request message, the control unit 140 may automatically input the PIN code for the WPS function or may activate the button input for the WPS function according to the PIN code or the button input command code included in the received automatic authentication request message, and may control the transmission of an automatic authentication response message. As described above, Wi-Fi devices of the same manufacturer may mutually transmit/receive an automatic authentication request message and an automatic authentication response message based on support information defined in a beacon message or a probe response message. Namely, it is possible to set a connection between the Wi-Fi devices according to the automation of the WPS function according to automatic authentication by the transmission/reception of the messages between the Wi-Fi devices of the same manufacturer based on the support information.

The control unit 140 will be described in more detail regarding a method for operation control as described below. The control unit 140 also performs various control operations related to typical functions of the Wi-Fi device. For example, when a communication function using a mobile communication network is executed in the Wi-Fi device, the control unit 140 may control operating of the communication function according to the execution of the application. Also, when an application of a communication function using a local network is executed in the Wi-Fi device, the control unit 140 may control operating of the communication function according to the execution of the application.

Meanwhile, the Wi-Fi devices illustrated in FIGS. 1 and 2 may include all types of information communication apparatuses, all types of multimedia apparatuses, and application apparatuses for all types of information communication apparatuses and all types of multimedia apparatuses. For example, the Wi-Fi device may include small devices, such as a mobile communication terminal, a smart phone, a Portable Multimedia Player (PMP), a digital broadcasting player, a Personal Digital Assistant (PDA), a music player (e.g. an MP3 player), and a portable game terminal, which operate by communication protocols corresponding to various communication systems. Also, the Wi-Fi device may be operated as a medium or large device, such as a Television (TV), a Large Format Display (LFD), a Digital Signage (DS), a media pole, a Personal Computer (PC), a notebook, a printer, and a combination apparatus.

FIG. 3 is an illustrative view showing a message format used to transmit support information of another Wi-Fi device according to an exemplary embodiment of the present invention.

Referring to FIG. 3, each of a beacon message and a probe response message as described above includes an Organizationally Unique Identifier (OUI) field 301, a Len (Length) field 303, an ID (Identifier) field 305, a Version field 307, a Type field 309, a Value field 311, and a Service Protocol Type field 313. The format of a probe response message will be illustratively described with reference to FIG. 3.

The OUI field 301 represents a service information field for defining service support information. The OUI field 301 may have a value indicating manufacturer information of a Wi-Fi device. For example, the OUI field 301 may have a value of "00 00 F0" for Samsung Electronics Co., Ltd. The OUI field 301 has a unique value assigned to each manufacturer. In an exemplary implementation, the OUI field 301 may include not only the manufacturer information as described above but also support information on functions and capability supported by the Wi-Fi device. Also, in the OUI field 301, support information on particular service information requested by a particular Wi-Fi device may be additionally defined. The OUI field 301 may be used to indicate that the relevant Wi-Fi device supports a WPS function according to automatic authentication, which is employed by Wi-Fi devices of the same manufacturer, and to enable the Wi-Fi devices to recognize the functions supportable by the Wi-Fi devices. An exemplary operation for transmitting/receiving a message including the OUI field 301 will be described below.

The Len field 303 represents a field for recording the entire size of a beacon message or a probe response message. The ID field 305 is used to prevent the duplication of the value of the OUI field 301 as described above, and represents a field of a state where a particular value is not determined. The Version field 307 represents a field for extension, and may be a field defined depending on the form change of a message used in a Wi-Fi based system. The Type field 309 represents a field for defining the type of a beacon message or a response message. The Type field 309 may be defined to indicate "resolved" for "0000," "advertise" for "0001," "WPS start request" for "0010," and "WPS response" for "0011."

The Value field 311 represents a field for defining a value for a Category of a Wi-Fi device and values for Sub-categories supported within the relevant Category based on the information table as described above. Namely, the Value field 311 is used to define an apparatus Category and Sub-categories of the Wi-Fi device. Therefore, the Value field 311 may have a value indicating which Category the relevant Wi-Fi device belongs to, and may have values indicating information on particular functions and capability supported by the relevant Wi-Fi device. For example, the Value field 311 may have a value indicating that the Wi-Fi device belongs to Audio Devices and values indicating a particular function and capability among the Audio Devices. Each value defined in the Value field 311 may be defined by previously classifying devices according to Categories as described with reference to Table 1.

The Service Protocol Type field 313 is used to define the protocol type of a wireless environment for transmitting/receiving a probe response message. The Service Protocol Type field 313, for example, may be defined to indicate "all service protocol types" for "00000000," "bonjour" for "00000001," "UPnP" for "00000010," "ws-discovery" for "00000011," and "vendor specific" for "11111111." Also, a value, which is still not defined in the Service Protocol Type field 313, has a state of "reserved."

A message (e.g. a beacon message or a probe response message) defined in an exemplary embodiment of the present invention may indicate which manufacturer has made a Wi-Fi device in the OUI field 301 as described above. Also, the OUI field 301 or the Value field 311 may be used to indicate which functions and capability are supported by the Wi-Fi device. An exemplary method for using these messages will be described below.

Scan processes among Wi-Fi devices are classified into two types. The first scan process is a passive scan method. The passive scan method corresponds to a method for using a beacon message transmitted by a Wi-Fi device operating in an AP mode. The beacon message indicates a value transmitted by the Wi-Fi device in the AP mode. The beacon message makes it possible to periodically broadcast the existence and support capability (e.g. a signal intensity and a usable bit-rate) of the Wi-Fi device in the AP mode to nearby Wi-Fi devices. According to the passive scan method, a Wi-Fi device operating in a non-AP mode (i.e. an STA mode) may obtain various pieces of information necessary to connect to a network through the candidate Wi-Fi devices, and/or service type information and capability information provided by the candidate Wi-Fi devices, etc., along with a list of the candidate Wi-Fi devices transmitting beacon messages.

The second scan process is an active scan method. In the active scan method, a Wi-Fi device in the non-AP mode requiring connection setting first transmits a probe request message to a counterpart Wi-Fi device in an AP mode. The probe request message may include particular service information requested by the Wi-Fi device in the non-AP mode. The Wi-Fi device in the AP mode, which has received the probe request message, transmits a probe response message as a response to the probe request message to the Wi-Fi device in the non-AP mode. The probe response message may include various pieces of information necessary for a direct Wi-Fi connection. Accordingly, the Wi-Fi device in the non-AP mode may obtain a list of candidate Wi-Fi devices through the received probe response message.

Hereinafter, an exemplary operation in a passive scan scheme and an exemplary operation in an active scan scheme will be separately described with reference to FIG. 4 and FIG. 5.

FIG. 4 is a signal flow diagram illustrating an operation for a Wi-Fi based service between Wi-Fi devices according to an exemplary embodiment of the present invention.

In FIG. 4, the transmission device 100 corresponds to a Wi-Fi device operating in the non-AP mode (i.e. the STA mode) and the reception devices 200 correspond to multiple Wi-Fi devices operating in the AP mode, as described above.

Referring to FIG. 4, the transmission device 100 may receive as input the execution of a Wi-Fi based application in step 401. Then, the transmission device 100 may receive a beacon message which is periodically transmitted by each of the reception devices 200 existing around the transmission device 100 in step 403. Each of the reception devices 200 may periodically broadcast a beacon message. Accordingly, the transmission device 100 may receive each beacon message before or after executing an application in step 401. Namely, each beacon message may be periodically broadcast by the Wi-Fi device in the AP mode as described above, so that the Wi-Fi device in the non-AP mode may periodically receive each beacon message in response.

Meanwhile, each of the reception devices 200 may include manufacturer information and information on functions that they support and on their capabilities in an OUI field of the beacon message, and may transmit the beacon message. For example, on the assumption that, among the reception devices 200, reception devices 210 and 230 are Wi-Fi devices according to exemplary embodiments of the present invention while a reception device 250 is a typical Wi-Fi device, each of the reception devices 210 and 230 may define the above information in the OUI field of the beacon message, and may transmit the beacon message including the above information. On the other hand, the typical reception device 250 may transmit a usual beacon message following a standard protocol. Then, each of the reception devices 200 may define a category and sub-categories of the relevant reception device in a Value field of the beacon message, and may transmit the beacon message including them.

When receiving the beacon message from each of the reception devices 200 existing around the transmission device 100, the transmission device 100 may check the OUI field of each beacon message in step 405. Then, the transmission device 100 may determine reception devices (e.g. the reception devices 210 and 230), each of which has the same manufacturer information as the transmission device 100 and supports a service corresponding to the executed application, with reference to the support information defined in the OUI field of each beacon message as described above in step 407. For example, the transmission device 100 may select counterpart devices, which have been manufactured by the same manufacturer as that of the transmission device 100, with reference to the OUI field of each received beacon message, and may select a counterpart device supporting a requested service among the selected counterpart devices. When there are multiple counterpart devices (e.g. the reception devices 210 and 230) of the same manufacturer, which support the requested service, the transmission device 100 may check two pieces of signal information (e.g. received signal intensities) of the relevant reception devices 210 and 230. Next, the transmission device 100 may select a reception device having signal information which has a value (e.g. signal intensity) equal to or greater than a threshold. When the number of counterpart devices, each of which has signal information having a value equal to or greater than the threshold, is also greater than one, the transmission device 100 may determine a counterpart device having the largest value in the signal information as a final counterpart device. The determination of a final counterpart device will be described in an exemplary method for operation control below. The case where the determined final counterpart device is the reception device 210 will be illustratively described below.

When the reception device 210 has been determined as the final counterpart device, the transmission device 100 transmits an automatic authentication request message for setting a Wi-Fi connection to the determined reception device 210 in step 409. In this specification, the automatic authentication request message refers to a message for requesting automatic connection setting according to automatic authentication by a standard previously and mutually agreed upon by devices of the same manufacturer based on information defined in an OUI field. The automatic authentication request message may include a PIN code or a button input command code for wireless encryption setting in a PIN scheme or in a Push Button Configuration (PBC) scheme.

When receiving the automatic authentication request message, the reception device 210 transmits an automatic authentication response message as a response to the received automatic authentication request message to the transmission device 100 in step 411. For example, when receiving the automatic authentication request message, the reception device 210 may set connection to the transmission device 100 in response to an automatic input using a PIN code included in the automatic authentication request message in the PIN scheme, and may transmit an automatic authentication response message as a response to the received automatic authentication request message to the transmission device 100. Other than this, when receiving the automatic authentication request message, the reception device 210 may set a connection to the transmission device 100 by automatically activating a button corresponding to a WPS function by a button input command code included in the received automatic authentication request message in the PBC scheme, and may transmit an automatic authentication response message as a response to the received automatic authentication request message to the transmission device 100.

The transmission device 100 and the reception device 210 may establish a communication channel for Wi-Fi communication by transmitting/receiving the automatic authentication request message and the automatic authentication response message as described above, and may complete interconnection setting in step 413.

When the transmission device 100 and the reception device 210 are interconnected, the transmission device 100 may transmit data, which corresponds to the application executed in step 401, to the reception device 210 in step 415. For example, it is assumed that the transmission device 100 requests video data reproduction and the reception device 210 is a display apparatus capable of outputting screen data. In this case where the transmission device 100 and the reception device 210 are interconnected by the automatic authentication therebetween as described above, the transmission device 100 may transmit the video data to the reception device 210 through the established communication channel. When receiving the video data, the reception device 210 may display the received video data through a display unit thereof.

FIG. 5 is a signal flow diagram illustrating an operation for a Wi-Fi based service between Wi-Fi devices according to an exemplary embodiment of the present invention.

In FIG. 5, the transmission device 100 corresponds to a Wi-Fi device operating in the non-AP mode (i.e. the STA mode) and the reception devices 200 correspond to multiple Wi-Fi devices operating in the AP mode, as described above.

Referring to FIG. 5, the transmission device 100 may receive as input the execution of a Wi-Fi based application in step 501. Then, the transmission device 100 broadcasts probe request messages in order to scan Wi-Fi devices existing around the transmission device 100 in step 503. A probe request message may include a particular service (e.g. request function information on the execution, reproduction, output, storage, etc. of data corresponding to the executed application) requested by a Wi-Fi device (e.g. the transmission device 100) in the non-AP mode.

When receiving the probe request message, each of the reception devices 200 transmits a probe response message as a response to the received probe request message to the transmission device 100 in step 505. At this time, each of the reception devices 200 may include manufacturer information, information on functions that they support, information on their capabilities, and support information on requested services in an OUI field of the probe response message, and may transmit the probe response message. For example, on the assumption that, among the reception devices 200, a reception device 210 is a Wi-Fi device according to an exemplary embodiment of the present invention while reception devices 230 and 250 are typical Wi-Fi devices, the reception device 210 may define the above information in the OUI field of the probe response message, and may transmit the probe response message including the above information. On the other hand, each of the typical reception devices 230 and 250 may transmit a usual probe response message following a standard protocol. Then, each of the reception devices 200 may define a Category and Sub-categories of the relevant reception device in a Value field of the probe response message, and may transmit the probe response message.

When receiving the probe response message from each of the reception devices 200 existing around the transmission device 100, the transmission device 100 may check the OUI field of each probe response message in step 507. Then, the transmission device 100 may determine a reception device (e.g. the reception device 210), each of which has the same manufacturer information as the transmission device 100 and supports a service corresponding to the executed application, with reference to the support information defined in the OUI field of each probe response message as described above in step 509.

Meanwhile, when there are multiple reception devices (e.g. the reception devices 210 and 230) of the same manufacturer, which support the requested service, the transmission device 100 may check two pieces of signal information (e.g. received signal intensities) of the relevant reception devices 210 and 230. Then, the transmission device 100 may select a reception device which has signal information having a value (e.g. signal intensity) equal to or greater than a preset threshold. When there are also a multiple number of reception devices, each of which has signal information having a value equal to or greater than the preset threshold, the transmission device 100 may determine a reception device having the largest value in the signal information as a final counterpart device (e.g. the reception device 210). The determination of a final counterpart device will be described in an exemplary method for operation control below.

When the reception device 210 has been determined as the final counterpart device, the transmission device 100 transmits an automatic authentication request message for setting a Wi-Fi connection to the determined reception device 210 in step 511. In this description, the automatic authentication request message refers to a message for requesting automatic connection setting according to automatic authentication by a standard previously and mutually agreed upon by devices of the same manufacturer based on information defined in an OUI field, as described above. The automatic authentication request message may include a PIN code or a button input command code for wireless encryption setting in a PIN scheme or in a PBC scheme.

When receiving the automatic authentication request message, the reception device 210 transmits an automatic authentication response message as a response to the received automatic authentication request message to the transmission device 100 in step 513. For example, when receiving the automatic authentication request message, the reception device 210 may set a connection to the transmission device 100 in response to an automatic input using a PIN code included in the automatic authentication request message in the PIN scheme, and may transmit an automatic authentication response message as a response to the received automatic authentication request message to the transmission device 100. Other than this, when receiving the automatic authentication request message, the reception device 210 may set a connection to the transmission device 100 by automatically activating a button corresponding to a WPS function according to a button input command code included in the received automatic authentication request message in the PBC scheme, and may transmit an automatic authentication response message as a response to the received automatic authentication request message to the transmission device 100.

Then, the transmission device 100 and the reception device 210 may establish a communication channel for Wi-Fi communication by transmitting/receiving the automatic authentication request message and the automatic authentication response message as described above, and may complete interconnection setting in step 515.

When the transmission device 100 and the reception device 210 are interconnected, the transmission device 100 may transmit data, which corresponds to the application executed in step 501, to the reception device 210 in step 517. For example, it is assumed that the transmission device 100 requests video data reproduction and the reception device 210 is a display apparatus capable of outputting screen data. In this case where the transmission device 100 and the reception device 210 are interconnected by the automatic authentication therebetween as described above, the transmission device 100 may transmit the video data to the reception device 210 through the established communication channel. When receiving the video data, the reception device 210 may display the received video data through a display unit thereof.

Figure 6:
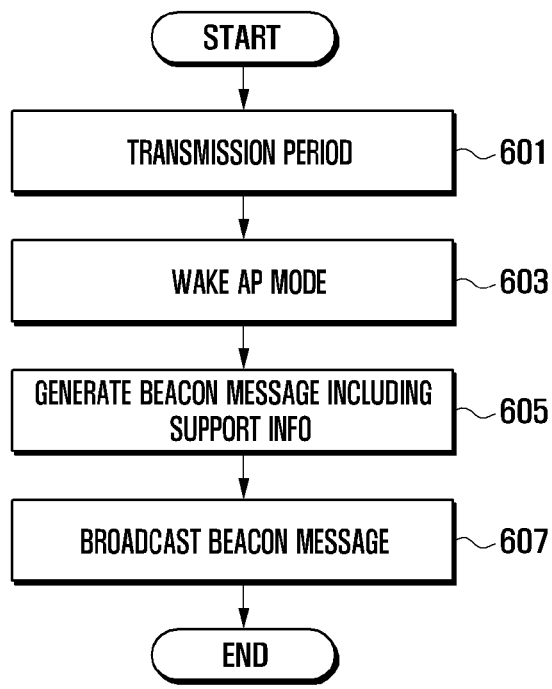
FIG. 6 is a flowchart showing an operation for transmitting a beacon message by a Wi-Fi device according to an exemplary embodiment of the present invention.

FIG. 6 is a flowchart showing an operation for transmitting a beacon message by a Wi-Fi device according to an exemplary embodiment of the present invention. In FIG. 6, a Wi-Fi device may correspond to a device (e.g. the reception device 210) operating in an AP mode as described above.

Referring to FIG. 6, when a time interval becomes a transmission period for a beacon message in step 601, the Wi-Fi device may drive the AP module 113 of the Wi-Fi module 110, and may wake the AP mode in step 603. In this case, the beacon message represents a value transmitted by the Wi-Fi device in the AP mode. The beacon message refers to a message used to periodically broadcast the existence and support capability (e.g. signal intensity, usable bit-rate, etc.) of the Wi-Fi device in the AP mode to other nearby Wi-Fi devices. When receiving the beacon message, each of other nearby Wi-Fi devices enables the Wi-Fi device in the AP mode to be synchronized with the time and to operate in a power saving mode by using the received beacon message. Accordingly, the beacon message may be periodically broadcast at beacon intervals each of which represents a time interval for transmitting a beacon message by the Wi-Fi device in the AP mode.

In step 605, the Wi-Fi device may generate a beacon message which includes the multiple pieces of information as described above and additionally includes support information. For example, the Wi-Fi device may add manufacturer information and information on functions it supports and its capability to an OUI field of a beacon message as described above, and may generate the beacon message. According to an exemplary implementation, the manufacturer information in the OUI field may indicate that the Wi-Fi device supports a WPS function according to automatic authentication between the Wi-Fi device and another Wi-Fi device which have been manufactured by the same manufacturer.

In step 607, the Wi-Fi device may transmit the generated beacon message to the nearby Wi-Fi devices. In this case, the beacon message may be periodically transmitted at beacon intervals as described above. Next, the Wi-Fi device may support a Wi-Fi service after setting a connection to a particular counterpart Wi-Fi device according to the automation of the WPS function by exchanging an automatic authentication request message and an automatic authentication response message between the Wi-Fi device and the particular counterpart Wi-Fi device as described above.

Figure 7:
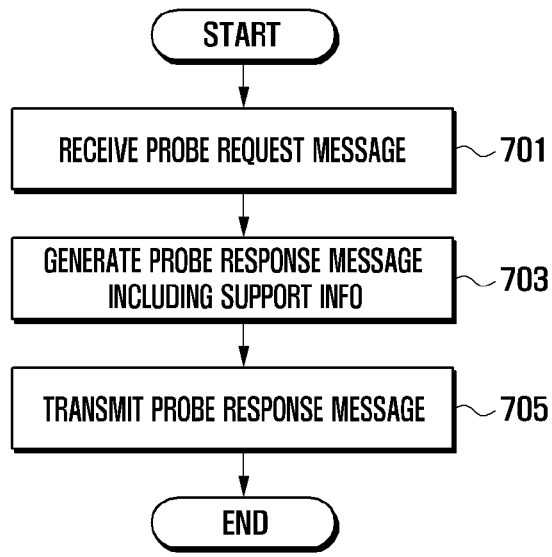
FIG. 7 is a flowchart showing an operation for transmitting a probe response message by a Wi-Fi device according to an exemplary embodiment of the present invention.

FIG. 7 is a flowchart showing an operation for transmitting a probe response message by a Wi-Fi device according to an exemplary embodiment of the present invention. In FIG. 7, the Wi-Fi device may correspond to a device (e.g. the reception device 210) operating in an AP mode as described above.

Referring to FIG. 7, the Wi-Fi device may receive a probe request message from a particular Wi-Fi device (e.g. the transmission device 100) operating in a non-AP mode (i.e. an STA mode) in step 701. The probe request message includes particular service information requested by the Wi-Fi device operating in the non-AP mode.

When receiving the probe request message, the Wi-Fi device may generate a probe response message additionally including support information in step 703. The probe response message may include various pieces of conventional information required for a connection to a Wi-Fi service. Also, the Wi-Fi device may generate a probe response message which includes the multiple pieces of conventional information and additionally includes manufacturer information and information on functions supported by the device and its capabilities in an OUI field thereof as described above. According to an exemplary embodiment of the present invention, the manufacturer information in the OUI field may indicate that the Wi-Fi device supports a WPS function according to automatic authentication between the Wi-Fi device and another Wi-Fi device which have been manufactured by the same manufacturer. Additionally, the Wi-Fi device may define support information, which indicates whether the Wi-Fi device can support particular service information requested by the probe request message, in the OUI field of the probe response message.

Then, the Wi-Fi device may transmit the generated probe response message to the counterpart Wi-Fi device (e.g. the transmission device 100) which has transmitted the probe request message in step 705. Next, the Wi-Fi device may support a Wi-Fi service after setting a connection to the counterpart Wi-Fi device according to the automation of the WPS function by exchanging an automatic authentication request message and an automatic authentication response message between the Wi-Fi device and the counterpart Wi-Fi device as described above.

Figure 8:
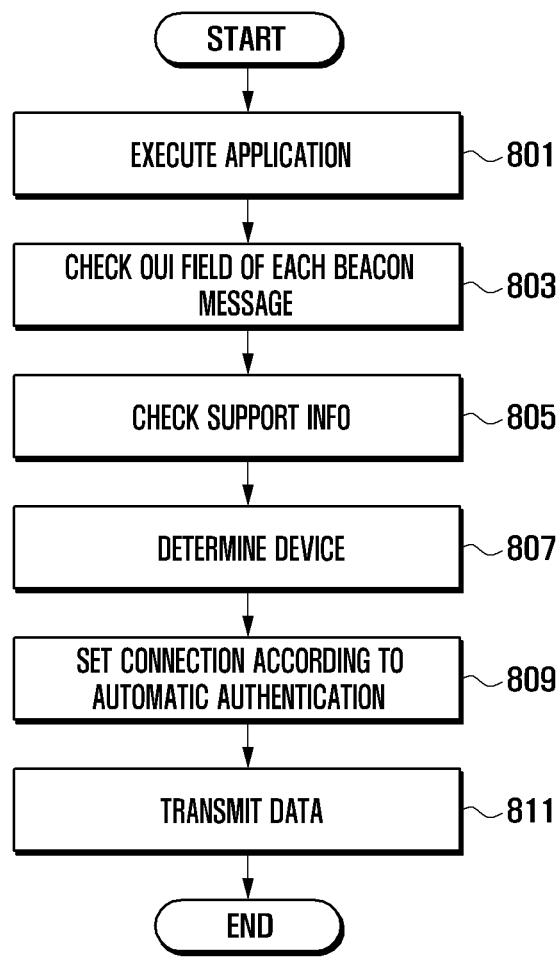
FIG. 8 is a flowchart illustrating an operation of a Wi-Fi device for a Wi-Fi service according to an exemplary embodiment of the present invention.

FIG. 8 is a flowchart illustrating an operation of a Wi-Fi device for a Wi-Fi service according to an exemplary embodiment of the present invention. In FIG. 8, a Wi-Fi device may correspond to a device (e.g. the transmission device 100) operating in a non-AP mode (i.e. an STA mode) as described above.

Referring to FIG. 8, when receiving as input the execution of a Wi-Fi based application in step 801, the control unit 140 may check an OUI field of a beacon message received from each of the other nearby Wi-Fi devices in step 803. The control unit 140 may receive a beacon message periodically broadcast by each of the Wi-Fi devices existing around the relevant Wi-Fi device as described above.

In step 805, the control unit 140 may check support information defined in an OUI field of each beacon message. In step 807, based on the support information, the control unit 140 may select Wi-Fi devices, which have been manufactured by the same manufacturer as that of the Wi-Fi device including the control unit 140, and may determine a counterpart Wi-Fi device capable of supporting a Wi-Fi service corresponding to the application, the execution of which has been requested, among the selected Wi-Fi devices. For example, it is assumed that a Wi-Fi service corresponding to the execution of the application is the output of video data. In this case, the control unit 140 may select Wi-Fi devices, which have been manufactured by the same manufacturer as that of the Wi-Fi device including the control unit 140, with reference to the OUI field of each beacon message. Then, the control unit 140 may finally determine a Wi-Fi device having the video data output function among the selected nearby Wi-Fi devices. When there are multiple devices of the same manufacturer, which support the requested service, the control unit 140 may determine an optimal counterpart Wi-Fi device based on multiple pieces of signal information of the relevant devices as described above. An exemplary method for determining an optimal counterpart device will be described below.

When the counterpart Wi-Fi device has been determined, the control unit 140 may set a connection to the determined counterpart Wi-Fi device according to automatic authentication between the relevant Wi-Fi device and the determined counterpart Wi-Fi device in step 809. In step 811, the control unit 140 may transmit data corresponding to the executed application to the determined counterpart Wi-Fi device. For example, when the counterpart Wi-Fi device has been determined, the control unit 140 may transmit, to the determined counterpart Wi-Fi device, an automatic authentication request message including a PIN code or a button input command code necessary to execute a WPS function according to automatic authentication in a PIN scheme or in a PBC scheme, as described above. When receiving an automatic authentication response message as a response to the automatic authentication request message, the control unit 140 may set a connection to the determined counterpart Wi-Fi device, and may transmit data to the determined counterpart Wi-Fi device.

Figure 9:
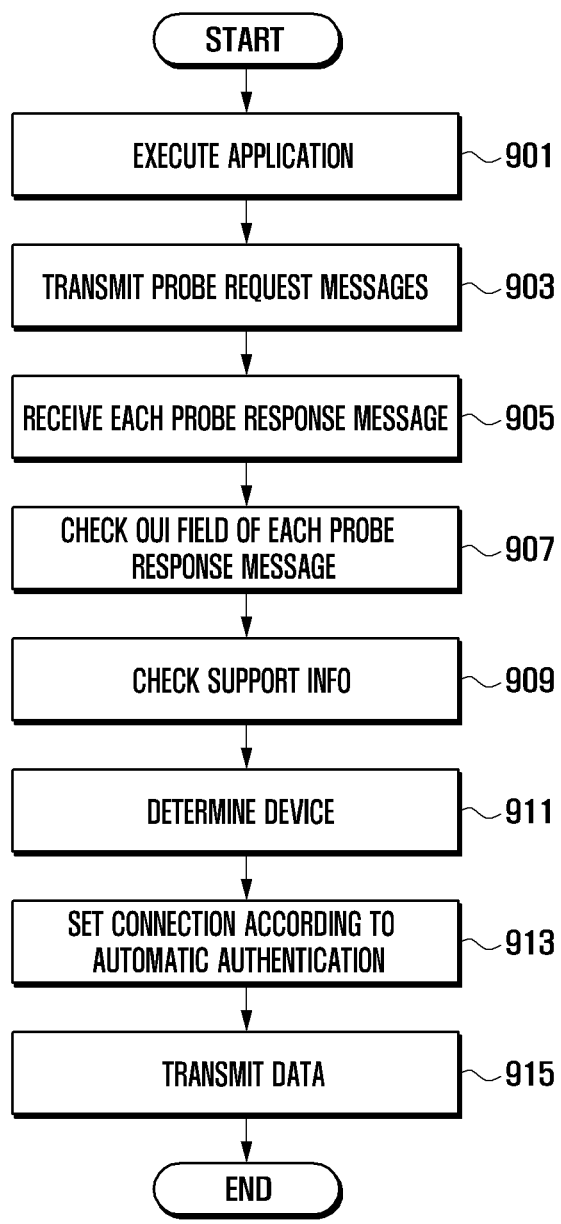
FIG. 9 is a flowchart illustrating an operation of a Wi-Fi device for a Wi-Fi service according to an exemplary embodiment of the present invention.

FIG. 9 is a flowchart illustrating an operation of a Wi-Fi device for a Wi-Fi service according to an exemplary embodiment of the present invention. In FIG. 9, a Wi-Fi device may correspond to a device (e.g. the transmission device 100) operating in a non-AP mode (i.e. an STA mode) as described above.

Referring to FIG. 9, when receiving as input the execution of a Wi-Fi based application in step 901, the control unit 140 may broadcast probe request messages in step 903. For example, when application execution is requested, the control unit 140 may generate and broadcast probe request messages for scanning Wi-Fi devices existing around the relevant Wi-Fi device. In this specification, a probe request message may include a particular service (e.g. request function information on the execution, reproduction, output, storage, etc. of data corresponding to the executed application) requested by a Wi-Fi device (e.g. the transmission device 100) in the non-AP mode, as described above.

In step 905, the control unit 140 may receive a probe response message as a response to the transmitted probe request message from each of the nearby Wi-Fi devices. In this description, a probe response message may include manufacturer information, information on functions supported by the device and its capabilities, support information on requested services, etc. in an OUI field thereof, as described above.

When receiving the probe response message from each of the nearby Wi-Fi devices, the control unit 140 may check the OUI field of each probe response message in step 907. In step 909, the control unit 140 may check support information defined in the OUI field of each probe response message. Based on the support information, the control unit 140 may select Wi-Fi devices, which have been manufactured by the same manufacturer as that of the Wi-Fi device including the control unit 140, and may determine a counterpart Wi-Fi device capable of supporting a Wi-Fi service corresponding to the application, the execution of which has been requested, among the selected Wi-Fi devices in step 911. For example, it is assumed that a Wi-Fi service corresponding to the execution of the application is the output of video data. In this case, the control unit 140 may select Wi-Fi devices, which have been manufactured by the same manufacturer as that of the Wi-Fi device including the control unit 140, with reference to the OUI field of each probe response message. Then, the control unit 140 may finally determine a Wi-Fi device having the video data output function among the selected nearby Wi-Fi devices. When there are multiple devices of the same manufacturer, which support the requested service, the control unit 140 may determine an optimal counterpart Wi-Fi device based on the multiple pieces of signal information of the relevant devices as described above. An exemplary method for determining an optimal counterpart device will be described below.

When the counterpart Wi-Fi device has been determined, the control unit 140 may set a connection to the determined counterpart Wi-Fi device according to automatic authentication between the relevant Wi-Fi device and the determined counterpart Wi-Fi device in step 913. In step 915, the control unit 140 may transmit data corresponding to the executed application to the determined counterpart Wi-Fi device. For example, when the counterpart Wi-Fi device has been determined, the control unit 140 may transmit, to the determined counterpart Wi-Fi device, an automatic authentication request message including a PIN code or a button input command code necessary to execute a WPS function according to automatic authentication in a PIN scheme or in a PBC scheme, as described above. When receiving an automatic authentication response message as a response to the automatic authentication request message, the control unit 140 may set a connection to the determined counterpart Wi-Fi device, and may transmit data to the determined counterpart Wi-Fi device.

Figure 10:
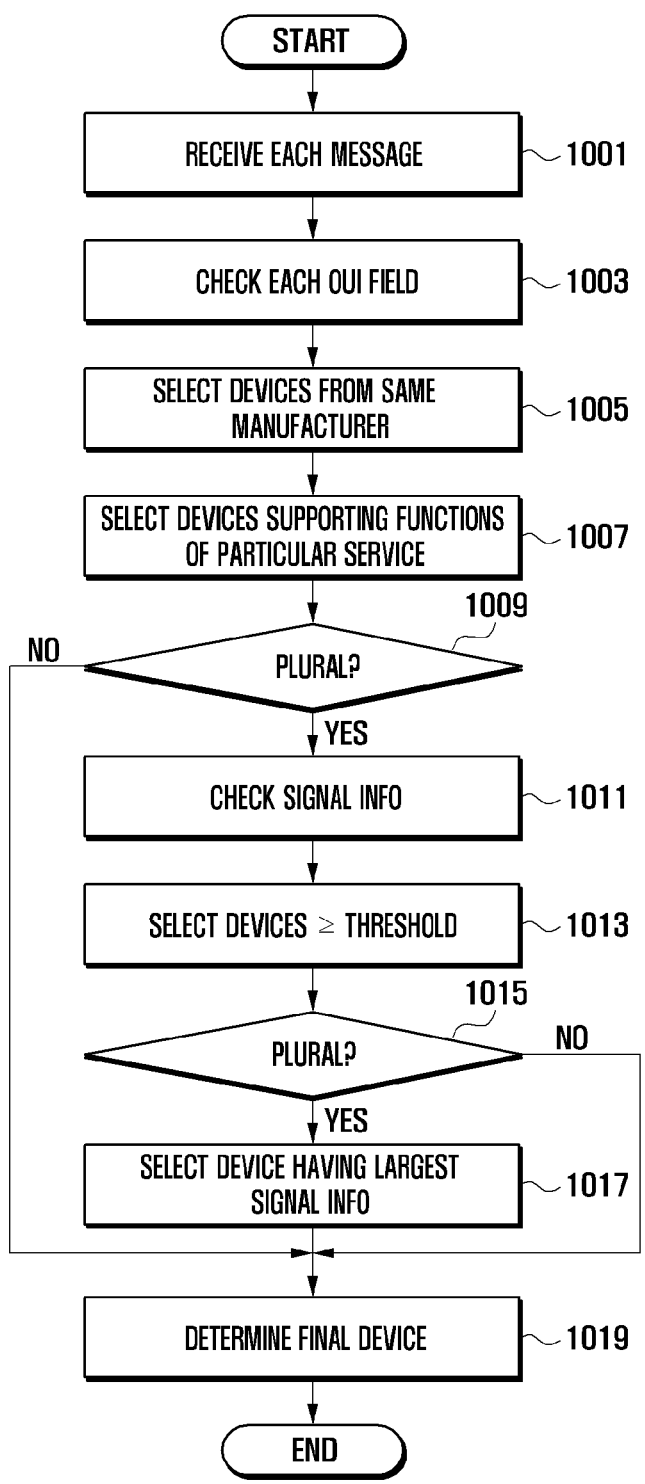
FIG. 10 is a flowchart showing a control method for determining a counterpart Wi-Fi device, to which a Wi-Fi device is to set a connection, by the Wi-Fi device according to an exemplary embodiment of the present invention.

FIG. 10 is a flowchart showing a control method for determining a counterpart Wi-Fi device, to which a Wi-Fi device is to set a connection, by the Wi-Fi device according to an exemplary embodiment of the present invention. In FIG. 10, a Wi-Fi device may correspond to a device operating in a non-AP mode (i.e. an STA mode). For example, FIG. 10 may show an operation for determining a final counterpart Wi-Fi device, to which the transmission device 100 is to set a direct connection among the multiple reception devices 200, as described above.

Referring to FIG. 10, the Wi-Fi device operating in a non-AP mode is first assumed to be in a state where the Wi-Fi device has received a message from each of Wi-Fi devices existing around it in step 1001. For example, the Wi-Fi device in the non-AP mode may receive a beacon message, which is periodically broadcast by each of the nearby Wi-Fi devices in an AP mode, as described above. Other than this, the Wi-Fi device in the non-AP mode may receive a probe response message as a response to the probe request message, which is transmitted by each of the nearby Wi-Fi devices in an AP mode, as described above.

When receiving each beacon message or each probe response message as described above, the control unit 140 of the Wi-Fi device may check an OUI field of each received message in step 1003. In step 1005, the control unit 140 may select devices, which have been manufactured by the same manufacturer as that of the Wi-Fi device including the control unit 140, based on manufacturer information in the OUI field of each received message. In step 1007, the control unit 140 may select devices capable of supporting a particular service corresponding to the application, the execution of which has been requested, based on support information in each OUI field among the selected devices of the same manufacturer.

In step 1009, the control unit 140 may determine whether the number of the devices selected in step 1007 is greater than one. For example, the control unit 140 may determine that the number of the first-selected devices of the same manufacturer is greater than one, and may determine that there are multiple devices each of which is secondly selected among the first-selected devices and supports a particular service.

When there is only one secondly-selected device (i.e., "NO" in step 1009), the control unit 140 proceeds to step 1019. In step 1019, the control unit 140 may determine the relevant device as a final counterpart device. On the other hand, when there is more than one secondly-selected device (i.e., "YES" in step 1009), the control unit 140 may check signal information of each device in step 1011. In this specification, the signal information may include received signal intensity, a bit-rate, etc. The signal information may be obtained by rules for checking signal intensities in Wi-Fi devices. Other than this, signal information (e.g. signal intensity and a bit-rate) of each device may be additionally included in a relevant message and the relevant message including the signal information may be transmitted, as described above.

In step 1013, the control unit 140 may select devices, each of which has signal information having a value (e.g. signal intensity) equal to or greater than a preset threshold among the multiple pieces of signal information of the secondly-selected devices. For example, the control unit 140 may select devices from the secondly-selected devices by checking their received signal intensities and by comparing each of the received signal intensities with the preset threshold.

Next, the control unit 140 may determine whether there are multiple devices, each of which has been selected in step 1013 and has the signal information having the value (e.g. signal intensity) equal to or greater than the threshold in step 1015. Namely, the control unit 140 may determine whether the number of the thirdly-selected devices is plural by checking the received signal intensities after the first and second selections, as described above.

When there is only one thirdly-selected device (i.e. "NO" in step 1015), the control unit 140 proceeds to step 1019. In step 1019, the control unit 140 may determine the relevant device as a final counterpart device. On the other hand, when there is more than one thirdly-selected device (i.e. "YES" in step 1015), the control unit 140 may select a device having the largest signal information among the multiple pieces of signal information (e.g. received signal intensities) of the thirdly-selected devices in step 1017. For example, the control unit 140 may select a device having the largest received signal intensity.

In step 1019, the control unit 140 may determine the finally-selected device as a final device for setting a connection to a Wi-Fi service.

Meanwhile, when no devices are selected as devices satisfying the above determination conditions in step 1009 or 1015 even though the relevant description and illustration are omitted in FIG. 10, the control unit 140 may control an operation of a set scheme. For example, after requesting message retransmission, the control unit 140 may re-perform the above operation based on newly-received messages. Other than this, the control unit 140 enables a user to manually select counterpart devices by outputting an error message and a list of devices collected by message reception.

Meanwhile, the above-described exemplary method for providing a Wi-Fi service by a Wi-Fi device may be implemented in the form of program instructions which can be performed by one or more various computers, and may be stored in a recording medium which can be read by the various computers. At this time, the recording medium, which can be read by the various computers, may separately include program instructions, data files and data structures, or may include combinations of them. Meanwhile, the program instructions stored in the recording medium may be specially designed and structured ones for exemplary embodiments of the present invention or ones which have been publicly known and can be used to/by those skilled in the computer software arts.

The recording media readable by the various computers include magnetic media such as a hard disc, a floppy disc and a magnetic tape, optical media such as a Compact Disc Read Only Memory (CD-ROM) and a Digital Versatile Disc (DVD), magnetic-optical media such as a floptical disc, a Read Only Memory (ROM), a Random access Memory (RAM), a flash memory, etc., which correspond to hardware apparatuses specially configured to store and execute the program instructions. Also, the program instructions include not only a machine code generated by a compiler but also a high-level language code executable by a computer by using an interpreter, etc. The above hardware apparatuses may be configured to operate as at least one software module in order to perform the operation of the present invention, and vice versa.

As described above, exemplary embodiments of the present invention provide a method and a system for providing a Wi-Fi service by a Wi-Fi device, in which Wi-Fi devices can transmit/receive information on their functions and capabilities supported to/from each other and an optimal counterpart Wi-Fi device can be determined among multiple counterpart Wi-Fi devices during automatic connection setting of a WPS function according to automatic authentication between the Wi-Fi devices. By doing this, each of the Wi-Fi devices can recognize the support information on the functions supported by the other Wi-Fi devices. Accordingly, when Wi-Fi devices are interconnected, each Wi-Fi device can automatically authenticate another Wi-Fi device without the intervention of a user. More particularly, when multiple Wi-Fi devices capable of supporting a particular service are selected, an optimal counterpart Wi-Fi device for performing the particular service can be automatically rapidly selected among the multiple Wi-Fi devices. Namely, when a particular application for using a Wi-Fi service is executed, it is possible to rapidly select an appropriate counterpart Wi-Fi device supporting the functions of the particular application, so that the convenience of using the service can be provided. According to exemplary embodiments of the present invention, inconvenient handling actions following a connection between the Wi-Fi devices can be reduced, so that it is possible to contribute to the improvement of the usability, convenience and competitiveness of the Wi-Fi devices.

Also, those skilled in the art in the technical field of the present invention will be able to understand that exemplary embodiments of the present invention as described above may be practiced in other specific forms without changing the technical ideas or essential features thereof. Therefore, it should be understood that the exemplary embodiments as described above are for illustrative purposes and do not limit the present invention in all aspects. Further, the scope of the present invention should be defined not by the above detailed description of the exemplary embodiments but by the accompanying claims, and should be construed to include the meaning and scope of the accompanying claims, and various modifications, additions and substitutions derived from the equivalent concepts of the accompanying claims.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a Wireless Fidelity (Wi-Fi) service, the method comprising:
   receiving, by a first device, messages from multiple counterpart devices;
   selecting one or more counterpart devices, from among the multiple counterpart devices that support a requested service and that have a same manufacturer as the first device, when the messages are received;
   checking multiple pieces of signal information of the selected counterpart devices when the number of the selected counterpart devices is greater than one; and
   determining a device having the signal information satisfying set conditions as a final device.

2. The method as claimed in claim 1, wherein the determining of the device comprises determining, as the final device, the counterpart device which has signal information having a value equal to or greater than a preset threshold among the selected counterpart devices.

3. The method as claimed in claim 2, wherein the determining of the device comprises determining, as the final device, a device having the largest signal information among multiple pieces of signal information of the counterpart devices when the number of the counterpart devices, each of which has the signal information having the value equal to or greater than the preset threshold, is greater than one.

4. The method as claimed in claim 1, wherein the receiving of the messages comprises receiving at least one of a beacon message periodically broadcast by each of the counterpart devices and a response message as a response to a request message transmitted by each of the counterpart devices.

5. The method as claimed in claim 4, wherein each of the beacon message and the response message comprises a service information field for including manufacturer information, capability information, and information on functions supported by each counterpart device.

6. The method as claimed in claim 1, further comprising:
   transmitting, to the determined final device, a request message for requesting execution of a Wi-Fi Protected Setup (WPS) function by an automatic authentication following a previously-defined protocol; and
   setting a connection to the final device according to the automatic authentication when a response message is received in response to the request message.

7. The method as claimed in claim 1, further comprising:
   executing an application; and
   determining, based on the received messages, at least one counterpart device that supports the executed application.

8. The method as claimed in claim 7, further comprising transmitting data corresponding to the executed application to the final device.

9. A system for providing a Wireless Fidelity (Wi-Fi) service, the system comprising:
   multiple first devices, each of which transmits a message including a service information field for including manufacturer information of the first devices and information on capabilities and functions supported by each of the first devices; and
   a second device for selecting one or more counterpart devices for performing a particular Wi-Fi based service with reference to the service information field of a message received from each of the first devices, and for determining a final device which has signal information satisfying set conditions, from among the selected counterpart devices that perform the particular Wi-Fi based service and which have a same manufacturer as the second device, each of which has signal information thereof, when the number of the selected counterpart devices is greater than one.

10. The system as claimed in claim 9, wherein the second device determines, as a final device, the counterpart device which has the signal information having a value equal to or greater than a preset threshold among the selected counterpart devices.

11. The system as claimed in claim 10, wherein the second device determines, as a final device, a device having the largest signal information among multiple pieces of signal information of counterpart devices when the number of the counterpart devices, each of which has the signal information having the value equal to or greater than the preset threshold, is greater than one.

12. The system as claimed in claim 9, wherein the message corresponds to at least one of a beacon message and a probe response message.

13. The system as claimed in claim 12, wherein each of the beacon message and the probe response message comprises the service information field for including manufacturer information, capability information, and information on functions supported by each Wi-Fi device.

14. The system as claimed in claim 9, wherein the second device transmits, to the determined final device, a request message for requesting execution of a Wi-Fi Protected Setup (WPS) function by an automatic authentication following a previously-defined protocol, and sets a connection to the final device according to the automatic authentication between the second device and the final device when receiving a response message in response to the request message.

15. The system as claimed in claim 9, wherein the signal information corresponds to a received signal intensity of each counterpart device.

16. The system as claimed in claim 9, wherein the second device executes an application and determines, based on the received messages, at least one counterpart device that supports the executed application.

17. The system as claimed in claim 16, wherein the second device transmits data corresponding to the executed application to the final device.

* * * * *